United States Patent Office 3,419,330
Patented Dec. 31, 1968

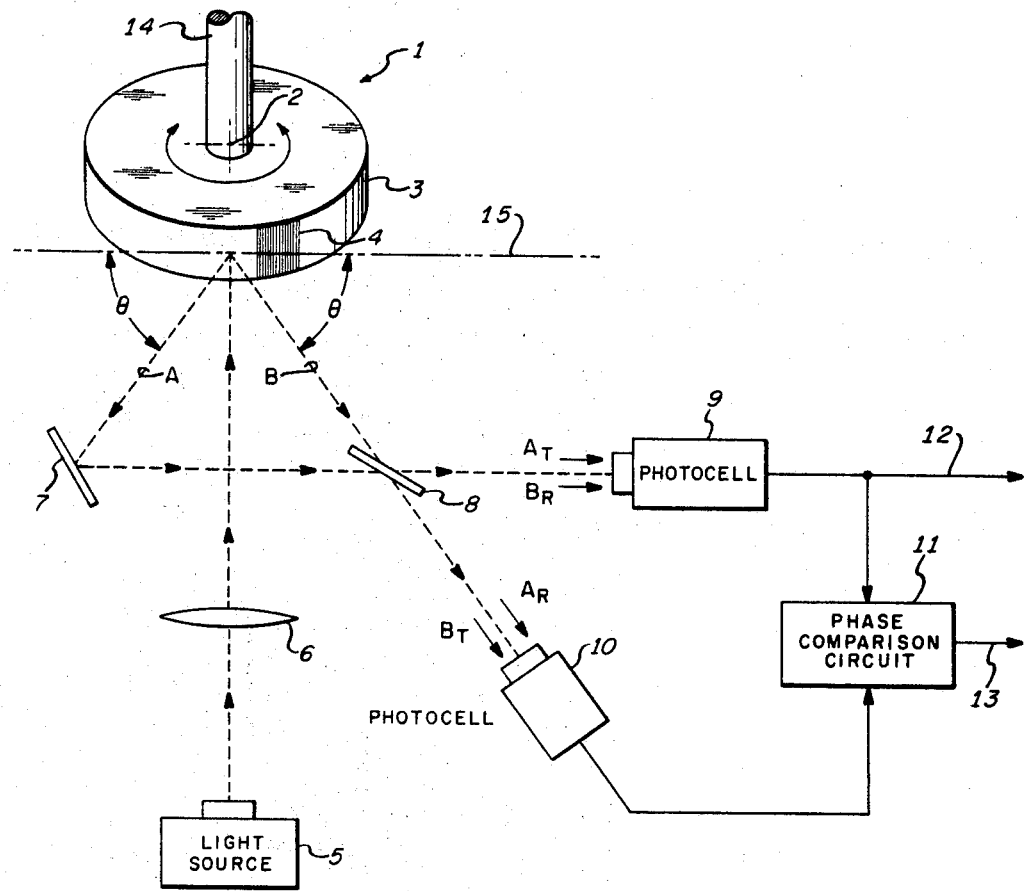

3,419,330
DIFFRACTION GRATING ANGULAR
RATE SENSOR
Joseph R. Schneider, Larchmont, N.Y., assignor to Sperry
Rand Corporation, Great Neck, N.Y., a corporation of
Delaware
Filed Apr. 6, 1965, Ser. No. 446,042
6 Claims. (Cl. 356—106)

ABSTRACT OF THE DISCLOSURE

A device for sensing the peripheral velocity of a rotating disc equipped with a diffraction grating tape fixed to the edge of the disc. A laser beam is directed at the diffraction grating tape and two beams diffusely reflected from the tape are heterodyned in a photocell to produce a first beat note. The frequency of the beat note represents disc velocity. A second photocell and beam splitter are used to produce a second beat note which is phase compared with the first beat note to determine the sense of rotation of the disc.

---

The present invention generally relates to devices for measuring the angular rate of a rotatable shaft and, more particularly, to low cost optical means cooperating with a diffraction grating for measuring shaft rotations to an extremely high degree of resolution.

Conventional devices for measuring shaft rotations with accuracy and high resolution include edge-inscribed discs mounted on the rotating shaft and means for monitoring the passing of each inscribed mark by a fixed point. Concentric markings also have been employed on the broad surface of discs with the spacings of the markings on successive rings varying in binary fashion to enable a binary encoded readout of shaft position. Each of the well known prior art shaft velocity or displacement sensors which rely on the passing of spaced fiducial marks past a fixed reference point, such as just described, are limited to the accuracy and resolution of the fiducial marks. For example, in the case of the edge inscribed disc, if a resolution of one arc second is desired, without interpolation, approximately 1,300,000 markings are required about the circumference of the disc. If the inscribed disc is held to a reasonable size, the state of the art of marking techniques limits the readout resolution of the inscribed disc to about 1 to 5 arc seconds. Moreover, such relatively limited resolution is achieved only at high cost.

It is a principal object of the present invention to provide optical means for determining the velocity of a moving body in which the basis of measurement is the wavelength of an optical carrier.

Another object is to provide low cost optical means for determining the angular velocity of a rotatable shaft in accordance with the changes of a diffraction pattern which represents the movement of the shaft.

A further object is to provide a diffraction grating angular rate sensor having a resolution which is a function of the wavelength of an optical carrier An additional object is to provide a low cost optical means for sensing the angular velocity and sense of angular velocity of a rotatable shaft with high resolution.

These and other objects of the present invention, as will appear from a reading of the following specification, are accomplished in the preferred embodiment by the provision of a disc coupled for rotation with the shaft whose angular velocity is to be determined The edge of the disc is inscribed with substantially uniformly spaced lines parallel to the rotational axis of the disc. In the disclosed embodiment, the inscribed lines are provided by a thin strip of aluminum coated acetate diffraction grating tape which is secured to the edge of the disc. The inscribed edge of the disc is illuminated by a source of intense and preferably monochromatic light of known wavelength. The light source is oriented so that light impinges radially on the edge of the disc.

Light beams reflected from the tape at a predetermined angle on either side of the incident light beam are redirected and split by a mirror and a beam splitter into two pairs of co-linear light beams. In the process, each of the first and second beams is partially reflected and partially transmitted by the same beam splitter. One of the beam pairs comprises the transmitted component of the first beam and the reflected component of the second beam. The other beam pair comprises the reflected component of the first beam and the transmitted component of the second beam. Each beam pair is heterodyned in a respective photocell to produce a beat note having a frequency representing shaft angular rate and a phase representing the sense of said shaft angular rate. The detected beat notes are applied to a phase comparison circuit so as to provide an output signal representing the sense of shaft rotation. The output signal of either photocell represents the magnitude of the shaft angular rate.

For a more complete understanding of the present invention, reference should be had to the following specification and to the sole figure which is a simplified schematic diagram of a preferred embodiment of the invention.

Referring to the figure, the numeral 1 generally designates a disc which is mounted for rotation about axis 2 in accordance with the rotation of an input shaft 14 whose rotational rate is to be determined. The edge 3 of the disc is inscribed with substantially uniformly spaced parallel lines 4 which are oriented parallel to the axis 2 of the disc. In a typical case, there are 13,400 lines per inch of disc perimeter. The inscribed lines 4 are provided by a thin layer of commercially available aluminum coated acetate diffraction grating tape which is fixed to the edge of disc 1. Suitable tape is available from the Edmund Scientific Company, Barrington, N.J., under the part number 50201.

The edge of the disc is illuminated by an intense beam of substantially monochromatic light from source 5. It is preferable that source 5 be a laser for example, a helium-neon gas laser. It is also preferable, although not mandatory, that the light beam emerging from the laser be further concentrated by means of a lens 6 on the edge of disc 1 in order to increase the amplitude of the final output signal representing the angular velocity of the input shaft about axis 2.

In accordance with the present invention, the diffraction grating tape is used in preference to a randomly diffuse surface. The use of said tape reduces intensity fluctuations of the reflected light caused by disc rotation and allows the detection of Doppler shifted light at an angle of reflection different from the angle of incidence.

The impining light beam is diffusely reflected at specific angles from the edge of disc 1. The two light beams A and B which are reflected on either side of the incident beam at the same angle $\theta$ relative to the disc tangent 15 are redirected by mirror 7 and beam splitter 8. Beam A is redirected by mirror 7 to impinge upon beam splitter 8. Beam also impinges upon beam splitter 8. Beams A and B are partially reflected and partially transmitted through the beam splitter. As is well known, the component which is partially reflected from the beam splitter experiences a phase delay which is different from the phase delay experienced by the component which is transmitted through the beam splitter. The transmitted component $A_T$ of beam A and the reflected component $B_R$ of beam B are applied to photocell 9. The transmitted component $B_T$ and the reflected component $A_R$ are applied to photocell 10.

Each photocell is operative as an optical frequency heterodyne mixer to produce an output electrical signal having a frequency equal to the frequency difference between the input beams. The magnitude of the phase difference between the two output electrical signals from the photocells is equal to twice the phase difference between the reflected and transmitted components at the beam splitter and is substantially independent of the frequencies of the two beams A and B. The sense of the phase difference between the output electrical signals, however, is determined by which of the two beams A and B has the higher frequency. The relative frequencies, in turn, are determined by the sense of the angular displacement of the input shaft which is to be determined. In the disclosed embodiment, the sense of the phase difference between the photocell output signals is measured by means of a conventional phase comparison circuit 11.

In the absence of disc rotation, i.e., in the absence of rotation of input shaft 14, the two reflected beams A and B are of the same frequency as that of the incident beam from the light source 5. Upon the rotation of disc 1, the tangential disc velocity at the point illuminated by the incident beam from source 5 may be resolved into components which lie along the directions of reflected beams A and B. The resolved component along the direction of beam A is equal but opposite in sense to the resolved component along the direction of beam B. In accordance with well understood principles of Doppler phenomena, the frequency of reflected beam A departs from the frequency of the incident beam by an amount equal but opposite in sense to the frequency departure of beam B. The magnitude of the frequency departure is directly proportional to the peripheral velocity of disc 1 and, thus, to the angular velocity of the disc which is to be determined. Consequently, the frequency of the beat note output of each of the photocells 9 and 10 represents the angular velocity of disc 1. Either output could be selected; the output 12 of photocell 9 is utilized in the disclosed embodiment to represent the magnitude of the angular velocity of disc 1. Output 13 from phase comparison circuit 11 represents the sense of said angular velocity.

An important feature of the present invention is that two optical frequency carrier signals A and B are heterodyned to produce the beat note which represents disc angular velocity. The magnitude of the Doppler frequency shift for a given velocity of the reflecting surface varies directly with the frequency of the impinging radiation. The direct use of optical carrier frequencies assures a maximum frequency shift of beams A and B and, hence, a maximum beat note frequency at the outputs of photocells 9 and 10 for maximum velocity resolution. Each of the beams A and B serves as an optical frequency reference for the other in order to detect the presence of a Doppler shift in either beam. In addition, the use of the two beams A and B (having opposite Doppler frequency shifts) permits the determination of the sense of the disc rotation. It is to be noted that disc angular velocity also can be ascertained by using either beam A or beam B and optically heterodyning the selected beam with the light from source 5 to produce a beat note. The frequency of the beat note is one half the frequency of that which would be produced by using both beams A and B in the manner of the preferred embodiment for a given set of operating conditions.

The angle $\theta$ of the selected reflected beams A and B is not critical. Generally, the smaller the angle $\theta$ the greater the Doppler frequency shift (for a given angular velocity) but the smaller the amplitude of the reflected beam. Thus, a compromise angle must be selected (as by varying the grating spacing or the light wavelength) at which sufficient Doppler frequency shift and sufficient amplitude of the reflected beam concurrently are realized.

It has been found that a randomly diffuse surface about the edge of disc 1 gives rise to scintillation effects which cause objectionable amplitude modulation and even the temporary elimination of the beat note signals at the output of photocells 9 and 10. This objectional result is obviated in the present invention through the use of the ruled reflecting diffraction grating surface on the edge of disc 1.

Although it is preferred in the present state of the art that a gas laser be utilized as light source 5 in order to provide a sufficiently intense source of light, the invention does not require that the incident light beam be strictly coherent; any sufficiently monochromatic and intense light source would suffice. Relatively high intensity is required of the incident light because only the diffusely reflected light from the rotating disc is utilized.

It should be observed that the present invention is immediately suitable for determining the velocity of any surface body which moves at a known angle across the direction of the incident beam. Thus, the moving surface may be that of a belt rather than a disc. It is also not necessary that the surface move at right angles relative to the direction of the incident beam; it is sufficient that the moving surface have a velocity component along the direction of either the incident or reflected beams or both.

It should also be noted that a particularly desirable result follows from the fact that the spot size of the incident light beam encompasses a very large number of diffraction grating lines on the disc edge. In a typical instance, the spot size is of the order of the total space occupied by 500 grating lines. Thus, the precise position of the individual grating lines becomes of less importance in terms of the ultimate accuracy with which velocity can be measured. It is only necessary that the number of grating lines per unit distance be accurately known.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Optical means for determining the velocity of a moving body, said body having a ruled reflecting diffraction grating surface, with at least two distinct angles of reflection, said means comprising
    a source of substantially monochromatic light for illuminating a portion of said surface,
    said surface moving in a direction at a known angle relative to the direction of incidence of said monochromatic light,
    light beam selecting means located along the paths of first and second light beams which are reflected from said portion in different directions corresponding to the angles of reflection of said ruled diffraction grating surface,
    and means optically heterodyning the selected light beams to produce a beat note representing said velocity of said moving body.

2. Optical means for determining the angular velocity of a rotating shaft comprising
    a disc coupled for rotation with said shaft,
    said disc having a ruled reflecting diffraction grating edge with at least two distinct angles of reflection,
    a source of substantially monochromatic light for illuminating a portion of said edge,
    said edge moving in a direction at a known angle relative to the direction of said monochromatic light at the point where said monochromatic light illuminates said edge,
    light beam selecting means located along the paths of first and second light beams which are reflected from said edge in different directions corresponding to the angles of reflection of said ruled diffraction grating edge, and means for optically heterodyning the selected light beams to produce a beat note representing said angular velocity of said rotating shaft.

3. Optical means as defined in claim 2 wherein said source of substantially monochromatic light comprises a laser.

4. Optical means for determining the velocity and the sense of the velocity of a moving body, said body having a ruled reflecting diffraction grating surface with at least two distinct angles of reflection, said means comprising a source of substantially monochromatic light for illuminating a portion of said surface, said surface moving in a direction at a known angle relative to the direction of said monochromatic light, a mirror and a beam splitter positioned to intercept first and second respective light beams which are reflected from said portion in different directions corresponding to the angles of reflection of said ruled diffraction grating surface, said mirror and said beam splitter being arranged so that each of said first and second beam is partially transmitted and partially reflected by said beam splitter to form two beam pairs, one beam pair comprising the transmitted component of said first beam and the reflected component of said second beam, said second beam pair comprising the reflected component of said first beam and the transmitted component of said second beam, first and second means for optically heterodyning said first and second beam pairs respectively to produce respective beat notes, each beat note representing said angular velocity of said rotating shaft, and means for phase comparing said beat notes to provide an output signal representing said sense of said angular velocity.

5. Optical means for determining the angular velocity and the sense of the angular velocity of a rotating shaft comprising a disc coupled for rotation with said shaft, said disc having a ruled reflecting diffraction grating edge with at least two distinct angles of reflection, a source of substantially monochromatic light for illuminating said edge radially of said disc, a mirror and a beam splitter positioned to intercept first and second respective light beams which are reflected from said edge in different directions corresponding to the angles of reflection of said ruled diffraction grating edge, said mirror and said beam splitter being arranged so that each of said first and second beams is partially transmitted and partially reflected by said beam splitter to form two beam pairs, one beam pair comprising the transmitted component of said first beam and the reflected component of said second beam, said second beam pair comprising the reflected component of said first beam and the transmitted component of said second beam, first and second means for optically heterodyning said first and second beam pairs respectively to produce respective beat notes, each beat note representing said angular velocity of said rotating shaft, and means for phase comparing said beat notes to provide an output signal representing said sense of said angular velocity.

6. Optical means as defined in claim 5 wherein said source of substantially monochromatic light is a laser and each said means for optically heterodyning is a photocell.

References Cited

UNITED STATES PATENTS

| 2,685,083 | 7/1954 | Beman | 340—271 X |
| 3,004,219 | 10/1961 | Albert | 324—70 |
| 3,267,284 | 8/1966 | Mackta | 350—162 X |

OTHER REFERENCES

Lasers for Distance Measurement, Measurement and Control, November 1964; pp. 431–432.

JEWELL H. PEDERSEN, *Primary Examiner.*

A. A. KASHINSKI, *Assistant Examiner.*

U.S. Cl. X.R.

350—162